United States Patent
Kwon et al.

(10) Patent No.: US 11,144,833 B2
(45) Date of Patent: Oct. 12, 2021

(54) DATA PROCESSING APPARATUS AND METHOD FOR MERGING AND PROCESSING DETERMINISTIC KNOWLEDGE AND NON-DETERMINISTIC KNOWLEDGE

(71) Applicant: Electronics and Telecommunications Research Institute, Daejeon (KR)

(72) Inventors: Soon Hyun Kwon, Incheon (KR); Eun Joo Kim, Daejeon (KR); Hong Kyu Park, Daejeon (KR); Hyun Joong Kang, Jinju-si (KR); Kwi Hoon Kim, Daejeon (KR); Young Min Kim, Daejeon (KR); Hyun Jae Kim, Incheon (KR); Ji Hoon Bae, Daejeon (KR); Se Won Oh, Daejeon (KR); Jae Hak Yu, Daejeon (KR); Yeon Hee Lee, Daejeon (KR); Ho Sung Lee, Daejeon (KR); Nae Soo Kim, Daejeon (KR); Sun Jin Kim, Daejeon (KR); Cheol Sig Pyo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1078 days.

(21) Appl. No.: 15/692,070

(22) Filed: Aug. 31, 2017

(65) Prior Publication Data
US 2018/0144250 A1    May 24, 2018

(30) Foreign Application Priority Data
Nov. 23, 2016 (KR) .................... 10-2016-0156396

(51) Int. Cl.
*G06F 11/36* (2006.01)
*G06F 16/25* (2019.01)
(Continued)

(52) U.S. Cl.
CPC ............... *G06N 5/006* (2013.01); *G06F 8/10* (2013.01); *G06F 16/289* (2019.01); *G06N 5/04* (2013.01); *G06F 8/36* (2013.01); *G06Q 10/06* (2013.01)

(58) Field of Classification Search
CPC .......... G06N 5/006; G06N 5/04; G06N 20/00; G06N 5/02; G06F 16/289; G06F 8/10; G06F 8/36; G06Q 10/06
(Continued)

(56) References Cited

U.S. PATENT DOCUMENTS

| 2011/0099532 A1 | 4/2011 | Coldicott et al. |
| 2013/0138586 A1 | 5/2013 | Jung et al. |

(Continued)

FOREIGN PATENT DOCUMENTS

| JP | 2013-205890 | 10/2013 |
| KR | 10-1644429 | 8/2016 |

(Continued)

OTHER PUBLICATIONS

Quan Wang et al., "Knowledge Base Completion Using Embeddings and Rules" Proceedings of the Twenty-Fourth International Joint Conference on Artificial Intelligence (IJCAI 2015), pp. 1859-1865.

(Continued)

*Primary Examiner* — Brandon S Cole
(74) *Attorney, Agent, or Firm* — Kile Park Reed & Houtteman PLLC

(57) ABSTRACT

Provided are a data processing apparatus and method for merging and processing deterministic knowledge and non-
(Continued)

deterministic knowledge. The data processing apparatus and method may efficiently process various real-time and large-scale data to convert the data into knowledge by merging and processing non-deterministic knowledge and also deterministic knowledge perceived by an expert. Thus, it is possible to adaptively operate in accordance with a dynamically changing application service environment by converting a conversion rule for converting collected data generated from an application service system into semantic data, a context awareness rule for perceiving context information from given information, and a user query for searching for knowledge information into knowledge and gradually augmenting the knowledge information in accordance with an application service environment.

6 Claims, 5 Drawing Sheets

(51) Int. Cl.
　　*G06F 16/24*　　(2019.01)
　　*G06N 5/00*　　(2006.01)
　　*G06F 8/10*　　(2018.01)
　　*G06F 16/28*　　(2019.01)
　　*G06N 5/04*　　(2006.01)
　　*G06F 8/36*　　(2018.01)
　　*G06Q 10/06*　　(2012.01)

(58) Field of Classification Search
　　USPC .......................................................... 706/1–62
　　See application file for complete search history.

(56) References Cited

U.S. PATENT DOCUMENTS

| | | | |
|---|---|---|---|
| 2013/0263092 A1* | 10/2013 | Chikahisa | G06F 11/3604 717/126 |
| 2015/0039651 A1* | 2/2015 | Kinsely | G06F 16/254 707/779 |
| 2015/0254561 A1* | 9/2015 | Singal | G06F 16/24564 707/713 |
| 2016/0140187 A1 | 5/2016 | Bae et al. | |
| 2017/0060854 A1* | 3/2017 | Zeng | G06F 40/55 |
| 2017/0235784 A1 | 8/2017 | Seon et al. | |
| 2017/0235848 A1* | 8/2017 | Van Dusen | G06F 16/904 705/12 |
| 2018/0144250 A1* | 5/2018 | Kwon | G06N 5/006 |

FOREIGN PATENT DOCUMENTS

| | | |
|---|---|---|
| KR | 10-2016-0103911 | 9/2016 |
| KR | 10-1662450 | 10/2016 |

OTHER PUBLICATIONS

Zhen Wang et al., "Knowledge Graph and Text Jointly Embedding", Proceedings of the 2014 Conference on Empirical Methods in Natural Language Processing (EMNLP), pp. 1591-1601, Oct. 25-29, 2014.

* cited by examiner

DATA PROCESSING APPARATUS AND METHOD FOR MERGING AND PROCESSING DETERMINISTIC KNOWLEDGE AND NON-DETERMINISTIC KNOWLEDGE

CROSS-REFERENCE TO RELATED APPLICATION

This application claims priority to and the benefit of Korean Patent Application No. 10-2016-0156396, filed on Nov. 23, 2016, the disclosure of which is incorporated herein by reference in its entirety.

BACKGROUND

1. Field

The present invention relates to a knowledge processing system for building a knowledge base composed of various knowledge information and using knowledge of the knowledge base, and more particularly, to a data processing apparatus and method for merging and processing deterministic knowledge and non-deterministic knowledge, the data processing apparatus and method being capable of efficiently processing various real-time and large-scale data to convert the data into knowledge by merging and processing deterministic knowledge perceived by an expert and also even non-deterministic knowledge.

2. Discussion of Related Art

Human beings can identify a variety of information coming from the outside through audiovisual equipment, understand its meanings, and grasp a situation and also can think and reason to solve problems according to external circumstances. Also, human beings can fairly freely transfer information by natural languages and understand the meaning of information freely represented like natural languages. Also, human beings have a learning ability to remember and utilize past experiences and knowledge obtained through activities of, for example, performing context awareness, solving a problem, understanding a natural language, understanding a pattern, or the like.

Knowledge processing refers to a technique for scientifically grasping intelligent activities of human beings, constructing the activities as a mechanical (mathematical) model, and using the mechanical model. To this end, it is necessary to specify a symbol processing function for handling knowledge as data, a knowledge base function for managing an aggregate of vast knowledge, and an inference processing function for controlling execution by an inference operation on a knowledge base.

Such a knowledge processing technique may be applied to various fields. An example of the fields is an expert system that allows general people to use expert knowledge of human beings by summarizing and representing the expert knowledge as an application field of artificial intelligence technology.

An expert system is composed of a user interface for providing a solution of a problem asked by a user, a knowledge base, which is an aggregate of knowledge information converted into data in association with a specific application field, and an inference engine for searching the knowledge base to solve the problem. Here, the knowledge base represents knowledge information through various methods such as a production rule, a semantic network, a frame, a blackboard, a case-based inference, a fuzzy logic, and a neural network.

Since such an expert system builds a knowledge base on the basis of expert knowledge, the type of data collected is static, and knowledge is not much changed. Accordingly, the expert system is suitable for medical and academic fields which can provide continuous service after building an initial system.

However, in an Internet of Everything (IoE) environment where collected data has various types and a knowledge base dynamically changes depending on context, it is impossible to provide a satisfactory service through a static knowledge base building method that relies on existing experts and also to handle a periodic change in the knowledge base, that is, context in which modification of schema information of the knowledge base is inevitable.

In addition, in order to address dynamic domain characteristics in the IoE environment, there is an absolute need for a virtuous cycle structure of knowledge that can continuously increase the amount of knowledge and automatically derive new knowledge by generating a new model through a statistical analysis method or a machine learning method, which is a data analysis method based on data, in addition to a data analysis method based on a knowledge base.

Also, data generated in the IoE environment is real-time data and large-scale data with a small association between pieces of data, but not an appropriate type of data that may provide semantic information to a corresponding service through data processing and data association based on the data. For this purpose, discussions are being conducted to integrate data processing technology of the Semantic Web, which is global web standard data. One example is the integration of Semantic Web technology to an Internet of things (IoT) standard (e.g., Release 2.x version of oneM2M).

In this way, the integration of Semantic Web technology is attempted for data linkage of the IoE. However, Semantic Web frameworks and semantic repositories that have been developed in the present Semantic Web technology exhibit performance not suitable for processing large-scale and real-time data generated in the IoE environment.

The integration of Semantic Web technology is essential to perform collaboration and intelligence between objects in the IoE. To this end, a knowledge processing system that may appropriately apply the Semantic Web technology, which has a static type, to the IoE environment, which has a dynamic type, and process large-scale and real-time IoE data is required to be developed.

SUMMARY

The present invention is directed to providing a data processing apparatus and method for merging and processing deterministic knowledge and non-deterministic knowledge, the data processing apparatus and method being capable of efficiently processing various real-time and large-scale data to convert the data into knowledge by merging and processing deterministic knowledge perceived by an expert and also even non-deterministic knowledge.

In particular, the present invention is directed to providing a data processing apparatus and method for merging and processing deterministic knowledge and non-deterministic knowledge, the data processing apparatus and method being capable of merging Semantic Web technology and a machine learning technique, adaptively processing large-scale and real-time data in a dynamically-changing environment such as the IoE environment, and achieving an intelligent object itself and an intelligent cooperation between objects through conversion of data into knowledge.

According to an aspect of the present invention, there is provided a data processing apparatus interoperating with a specific application service system to process knowledge information of a corresponding application service environment including: a knowledge base unit configured to store the knowledge information, the knowledge information including a conversion rule for converting collected data generated by the application service system into a predetermined type of knowledge; a machine learning unit configured to perform machine learning on the converted knowledge stored in the knowledge base unit on a data type basis and extract extensive conversion rule information according to the type of collected data; and a data conversion unit configured to input data type information regarding collected data generated in the specific application service environment and the conversion rule of the knowledge base unit to the machine learning unit, augment the conversion rule of the knowledge base unit by reflecting the extensive conversion rule information extracted by the machine learning unit, and convert the collected data generated in the specific application service environment into knowledge information on the basis of the conversion rule of the knowledge base unit.

The data conversion unit may convert the collected data into semantic data.

The data processing apparatus may further include a query unit configured to search the knowledge base unit according to a user query delivered from the application service system, determine whether the user query has a predetermined structured format, and convert the user query into the structured format through the machine learning unit when the user query does not have the structured format. The knowledge base unit may further store knowledge information regarding the user query. The machine learning unit may perform learning on the basis of the knowledge information regarding the user query stored in the knowledge base unit to extract complete query information for converting the user query into the structured format. The query unit may convert the user query into the structured format on the basis of the complete query information.

The data processing apparatus may further include a context awareness unit configured to receive context information, service information, and rule generation information from the application service system, generate context awareness rules for context awareness, extract complete rule information for an incomplete rule among the generated context awareness rules through the machine learning unit, generate a complete context awareness rule by reflecting the extracted complete rule information, and provide context information or service information derived by applying the context awareness rule to the application service system. The knowledge base unit may further include knowledge information regarding the context awareness rule. The machine learning unit may perform machine learning on the knowledge information regarding the context awareness rule to extract the complete rule information.

The data processing apparatus may further include an inference unit configured to infer the context information or service information from the collected data on the basis of an inference rule including the context awareness rule.

According to another aspect of the present invention, there is provided a data processing apparatus for merging and processing deterministic knowledge and non-deterministic knowledge including: a knowledge base unit configured to store the knowledge information, the knowledge information including a context awareness rule for deriving context information or service information in an application service environment; a machine learning unit configured to perform machine learning on rule information regarding the context awareness rule to extract complete rule information from incomplete rule information; and a context awareness unit configured to receive context information, service information, and rule generation information from the application service system, generate context awareness rules for context awareness, extract complete rule information for an incomplete rule among the generated context awareness rules through the machine learning unit, generate a complete context awareness rule by reflecting the extracted complete rule information, and provide context information or service information derived by applying the context awareness rule to the application service system.

The data processing apparatus may further include an inference unit configured to infer the context information or service information by performing an inference on the basis of an inference rule including the context awareness rule.

According to still another aspect of the present invention, there is provided a data processing apparatus for merging and processing deterministic knowledge and non-deterministic knowledge including: a knowledge base unit configured to store the knowledge information, the knowledge information including a user query generated by an application service environment; a machine learning unit configured to perform machine learning on the basis of knowledge information regarding the user query stored in the knowledge base unit to extract complete query information for completing a semi-structured user query to a structured format; and a query unit configured to determine whether a user query delivered from the application service system has a predetermined structured format, apply the complete query information extracted by the machine learning unit to convert the user query into the structured format when the user query does not have the structured format, and process the user query of the structured format.

According to still another aspect of the present invention, there is provided a data processing method for interoperating with a specific application service system to process knowledge information of a corresponding application service environment including: storing knowledge information regarding a conversion rule for converting data generated by the application service system into a predetermined type of knowledge; and converting collected data generated in the application service environment into the predetermined type of data on the basis of the knowledge information regarding the conversion rule, wherein the converting includes performing machine learning on the conversion rule on the basis of data types of the collected data generated in the application service system to extract extensive conversion rule information according to the type of collected data; and augmenting the knowledge information regarding the conversion rule by reflecting the extensive conversion rule information.

According to still another aspect of the present invention, there is provided a data processing method for interoperating with a specific application service system to process knowledge information of a corresponding application service environment including: storing knowledge information regarding a context awareness rule for inferring context information or service information in the application service environment; and inferring the context information or the service information from collected data generated in the application service environment on the basis of the context awareness rule, wherein the inferring includes: generating the context awareness rule on the basis of context information, service information, and rule generation information delivered from the application service system; performing machine learning on a prestored context awareness rule to derive complete rule information for incomplete rule information when the generated context awareness rule is a complete rule; and converting an incomplete context awareness rule into the complete rule by applying the derived complete rule information.

According to still another aspect of the present invention, there is provided a data processing method for interoperating with a specific application service system to process knowledge information of a corresponding application service environment including: storing knowledge information regarding a user query generated in the application service system; and processing a user query when the user query is received from the application service system, wherein the processing includes determining whether the received user query has a predetermined structured format; performing machine learning on the basis of information regarding a user query converted into knowledge and extracting complete query information for converting the user query into the structured format when the user query does not have the structured format; and converting the received user query into the structured format by applying the extracted complete query information.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
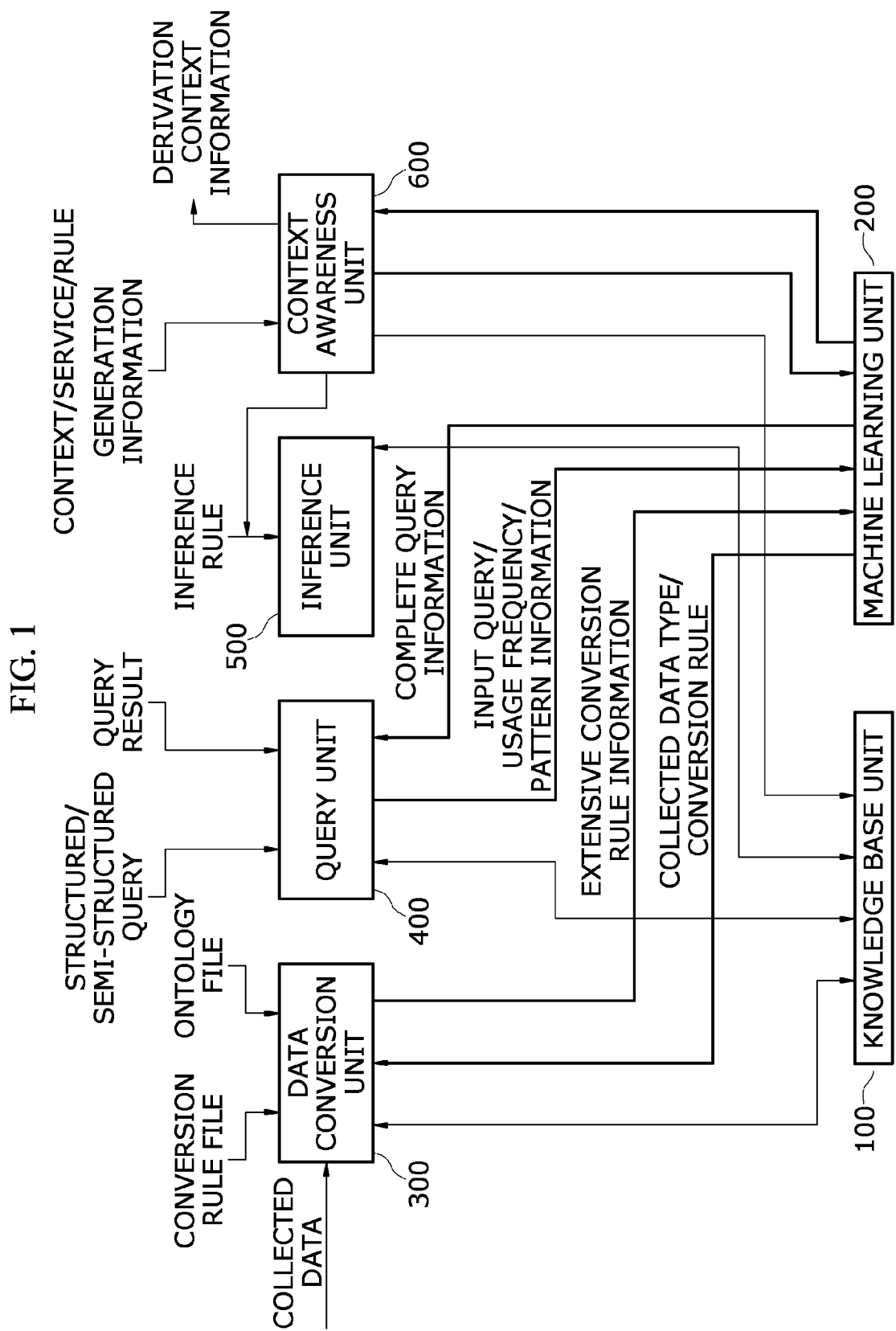
FIG. 1 is a block diagram schematically showing an entire configuration of a data processing apparatus for merging and processing deterministic knowledge and non-deterministic knowledge according to the present invention.

Hereinafter, exemplary embodiments of the present invention will be described in detail with reference to the accompanying drawings. The features and advantages of aspects of the present invention will become more apparent from the detailed description set forth below.

However, detailed descriptions of well-known functions or configurations will be omitted since they would unnecessarily obscure the subject matters of the present invention. Also, it should be noted that like reference numerals denote like elements throughout the specification and drawings.

The terms or words used in the following description and drawings should not be construed as being limited to typical or dictionary meanings, but should be construed as the meaning and concept corresponding to the technical idea of the present invention on the basis of the principle that an inventor can appropriately define the concept of the term for describing his or her invention in the best manner. Therefore, since embodiments described in this specification and configurations illustrated in drawings are merely just exemplary embodiments and do not represent the spirit of the present invention, it should be understood that there may be various equivalents and modifications that can be replaced at the time of filing of this application.

While the terms including an ordinal number, such as "first," "second," etc. may be used herein to describe various elements, such elements are not limited to those terms. The terms are only to distinguish one element from another. For example, a first element could be termed a second element, and similarly, a second element could be termed a first element, without departing from the scope of the present invention.

It is to be understood that when one element is referred to as being "connected to" or "coupled to" another element, it may be connected or coupled logically or physically. In other words, it is to be understood that one element may be directly connected or coupled to another element or indirectly connected or coupled to another element with a third element intervening therebetween.

The terms used in the present specification are set forth to explain the embodiments of the present invention, and the scope of the present invention is not limited thereto. As used herein, the singular forms "a," "an," and "the" are intended to include the plural forms as well, unless the context clearly indicates otherwise. It should be further understood that the terms "include," "comprise," or "have" used in this specification, specify the presence of stated features, numerals, steps, operations, components, parts, or combinations thereof, but do not preclude the presence or addition of one or more other features, numerals, steps, operations, components, parts, or combinations thereof.

The configuration and functions of the apparatus according to the present invention may be implemented as a program module including one or more computer-readable instructions, which may operate a specific function described in this disclosure by being stored in a recording medium such as a memory and then being loaded and executed by a processor. Here, the computer-readable instructions include instructions and data for enabling a general-purpose computer system or a special-purpose computer system to perform a specific function or a specific function group. The computer-readable instructions may be, for example, binary intermediate format instructions such as an assembly language or even source code.

That is, the data processing apparatus for merging and processing deterministic knowledge and non-deterministic knowledge according to the present invention may be implemented as software including computer programs or a combination of hardware including a memory and a processor, such as a computer system, and software installed in and executed by the hardware.

A computer program installed in the computer system to execute the method according to the present invention can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a single file dedicated to the program in question, in multiple coordinated files (e.g., files that store one or more modules, sub programs, or portions of code), or in a portion of a file that holds other programs or data (e.g., one or more scripts stored in a markup language document). In addition, a computer program can be deployed to be executed on one computer or on multiple computers that are located at one site or distributed across multiple sites and interconnected by a communication network.

Computer readable media suitable for storing such a computer program include all forms of nonvolatile memory, media and memory devices, including by way of example of semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

Furthermore, the data processing apparatus for merging and processing deterministic knowledge and non-deterministic knowledge is applied to various application service systems, for example, an IoE service system to which various objects and sensors are connected to dynamically process collected data or information generated by the application service system and convert the data or information into knowledge and provide necessary knowledge information according to a request from the application service system. Here, the application service system to which the present invention is applied is not limited to the IoE service system. That is, the application service system to which the present invention is applied can be any service system that requires knowledge processing. For example, the application service system may perform an inference on the basis of pre-built knowledge information and provide a result of the inference when the application service system should be associated with a closed factory automation system to build and augment a knowledge base for factory automation processing and also the factory automation system should perform determinations such as a failure prediction, a failure recovery, or the like.

In particular, the apparatus according to the present invention may adaptively operate in accordance with a dynamically changing application service environment, convert various types of data and information into knowledge, and infer new information on the basis of information built in the above manner by converting a conversion rule for converting collected data generated from the application service system into a predetermined type of knowledge information, a context awareness rule for perceiving context information or service information from the collected data, and a user query for searching for the knowledge information into knowledge, storing the knowledge in a knowledge base, and then gradually augmenting the knowledge in accordance with the application service environment.

The data processing apparatus described in the following embodiment will be described as applying Semantic Web technology, storing knowledge information as semantic data, and performing query processing and inference on the basis of semantics. However, the present invention is not limited thereto.

The entire configuration of the apparatus according to the present invention will be described with reference to FIG. 1.

FIG. 1 is a block diagram schematically showing an entire configuration of a data processing apparatus for merging and processing deterministic knowledge and non-deterministic knowledge according to the present invention.

Referring to FIG. 1, the apparatus includes a knowledge base unit 100, a machine learning unit 200, a data conversion unit 300, a query unit 400, an inference unit 500, and a context awareness unit 600.

The knowledge base unit 100 is a storage configured to store and mange knowledge information. A variety of knowledge information contains knowledge information that is represented by at least one or more of various well-known methods such as production rules, semantic networks, frames, blackboards, case-centered inference, fuzzy logic, neural networks, or the like. The knowledge base unit 100 may be interpreted as a concept including one or more of a memory device configured to store knowledge information, a partial portion of the memory device, and a data set composed of knowledge information.

In the present invention, the knowledge information stored in the knowledge base unit 100 may include default knowledge information provided by experts in an application service field and extended knowledge information augmented from the default knowledge information according to operation of an application service system and may further include various rules needed to generate such knowledge information, for example, a conversion rule for converting collected data into a predetermined type of knowledge information, a context awareness rule for deriving situation or service information from collected data, and even information for converting a user query for searching for the knowledge information into knowledge and using knowledge information.

The knowledge base unit 100 may be implemented as a distributed structure for efficiently managing and operating a vast amount of data. In this case, accesses between the knowledge base unit 100 and the data conversion unit 300, the query unit 400, and the inference unit 500 may be controlled through a distributed resource manager (not shown).

According to the apparatus according to the present invention, the machine learning unit 200 learns the rules needed to perform knowledge conversion (including the data conversion rule and the context awareness rule) and the user query used to search for the knowledge information and derives information needed to generate the rules and the user query (e.g., extensive conversion rule information, complete query information, complete rule information, etc.).

The data conversion unit 300 is configured to convert various collected data generated by the application service system into a predetermined type of knowledge information and store the knowledge information in the knowledge base unit 100. For example, the collected data may be converted into semantic data. To this end, the data conversion unit 300 may previously load conversion rules, an ontology, or the like for the conversion into the semantic data and may port the loaded conversion rule, ontology, or the like into an internal memory (e.g., a platform in memory).

Also, the data conversion unit 300 collects multimodal data (stream data, structured data, non-structured data) generated by the application service system and converts the collected data into knowledge information (e.g., semantic data) according to the conversion rule. Here, the collected data may be collected through a separate data collection device (not shown). In this case, when the collected data is a new type of data, there is no conversion rule appropriate for converting the collected data into the semantic data among the conversion rules loaded from the knowledge base unit 100. In this case, the data conversion unit 300 may input type information of the collected data and a pre-existing conversion rule to the machine learning unit 200 and receive extensive conversion rule information applicable to the data type from the machine learning unit 200.

Also, the data conversion unit 300 applies a machine learning analysis result, that is, the extensive conversion rule information to the conversion rule loaded from the knowledge base unit 100, convert the data collected from the application service system into semantic data, and store the semantic data in the knowledge base unit 100.

Thus, the data conversion unit 300 may collect various types of multimodal data generated by the application service system and store the multimodal data in the knowledge base unit 100 as knowledge information.

The query unit 400 is configured to process a user query generated by the knowledge base unit 100 and search for queried knowledge information. Here, the user query may be delivered through the application service system and also may be input through a separate user interface. According to an embodiment of the present invention, the query unit 400 operates based on the Semantic Web technology, and the user query may include both of a query of a predefined structured format, for example, a semantic query language (e.g., SPARQL) and a query of an undefined semi-structured format.

Thus, the query unit 400 directly processes a user query of a structured format, searches the knowledge base unit 100 for corresponding knowledge information, and returns found knowledge information to the application service system. Conversely, when the input user query has a semi-constructed format, the query unit 400 converts the user query of the semi-structured format into a user query of a structured format (e.g., SPARQL) through a machine learning analysis by the machine learning unit 200, processes the converted user query, and returns a result of performing the query to the corresponding application service system. Here, the conversion into the structured format does not merely denote only data format conversion, but denotes newly defining an undefined user query through analytical comparison between the undefined user query and other similar user queries and then completing the user query to the structured format. This will be described in detail below.

The inference unit 500 is configured to perform an inference by applying a predetermined inference rule on the basis of the knowledge information stored in the knowledge base unit 100. To this end, the inference unit 500 loads an inference rule written in the form of a user defined rule as well as in a predetermined format, for example, in the form of a Semantic Web standard rule (a RDF rule, an OWL rule, or the like) from the knowledge base unit 100 and ports the loaded inference rule into an internal memory (a platform in memory). Also, the inference unit 500 performs a distributed parallel inference on data or information collected through the inference rule and stores a result of the inference in the knowledge base unit 100 as new knowledge information. In this case, the inference unit 500 may apply a context awareness rule extracted by the context awareness unit 600 as the inference rule to perform an inference on collected data that is newly input.

The context awareness unit 600 is configured to provide a context awareness service upon a request from the application service system. To this end, according to the present invention, the context awareness unit 600 may generate and extend a context awareness rule appropriate for the application service system. In detail, the context awareness unit 600 receives context information, service information, or context rule information of a corresponding application service delivered from the application service system. In addition, the context awareness unit 600 loads domain knowledge information (e.g., an ontology type) of the corresponding service to derive the context information from the knowledge base unit 100.

Also, in order to extend a pre-built context awareness rule, the context awareness unit 600 delivers the domain knowledge information, the pre-built context awareness rule, the context information or service information delivered from the application service system, and the received collected data, that is, the multimodal data converted into the semantic data through the data conversion unit 300 and stored in the knowledge base unit 100 to the machine learning unit 200 and then receives complete rule information for completing an undefined context awareness rule.

The context awareness unit 600 applies the complete rule information extracted by the machine learning unit 200 to complete the context awareness rule and delivers the complete context awareness rule to the inference unit 500 to enable the inference unit 500 to infer context information. Also, the context awareness unit 600 returns the context information derived through the inference unit 500 to the corresponding application service system.

By using the above configuration, the data processing apparatus for merging and processing deterministic knowledge and non-deterministic knowledge may collect various types of data generated in an application service environment, automatically store the collected data as a predetermined type of (e.g., semantic) knowledge information, infer context information or service information of the application service environment, augment the knowledge information, and provide knowledge information queried by a user among all knowledge information including the augmented knowledge information. Furthermore, the data processing apparatus may be automatically aware of context of an application service environment by merging a knowledge base and individual domain knowledge.

Subsequently, a process for the data conversion, user query, inference, and context awareness will be described in detail below with reference to FIGS. 2 to 4.

Figure 2:
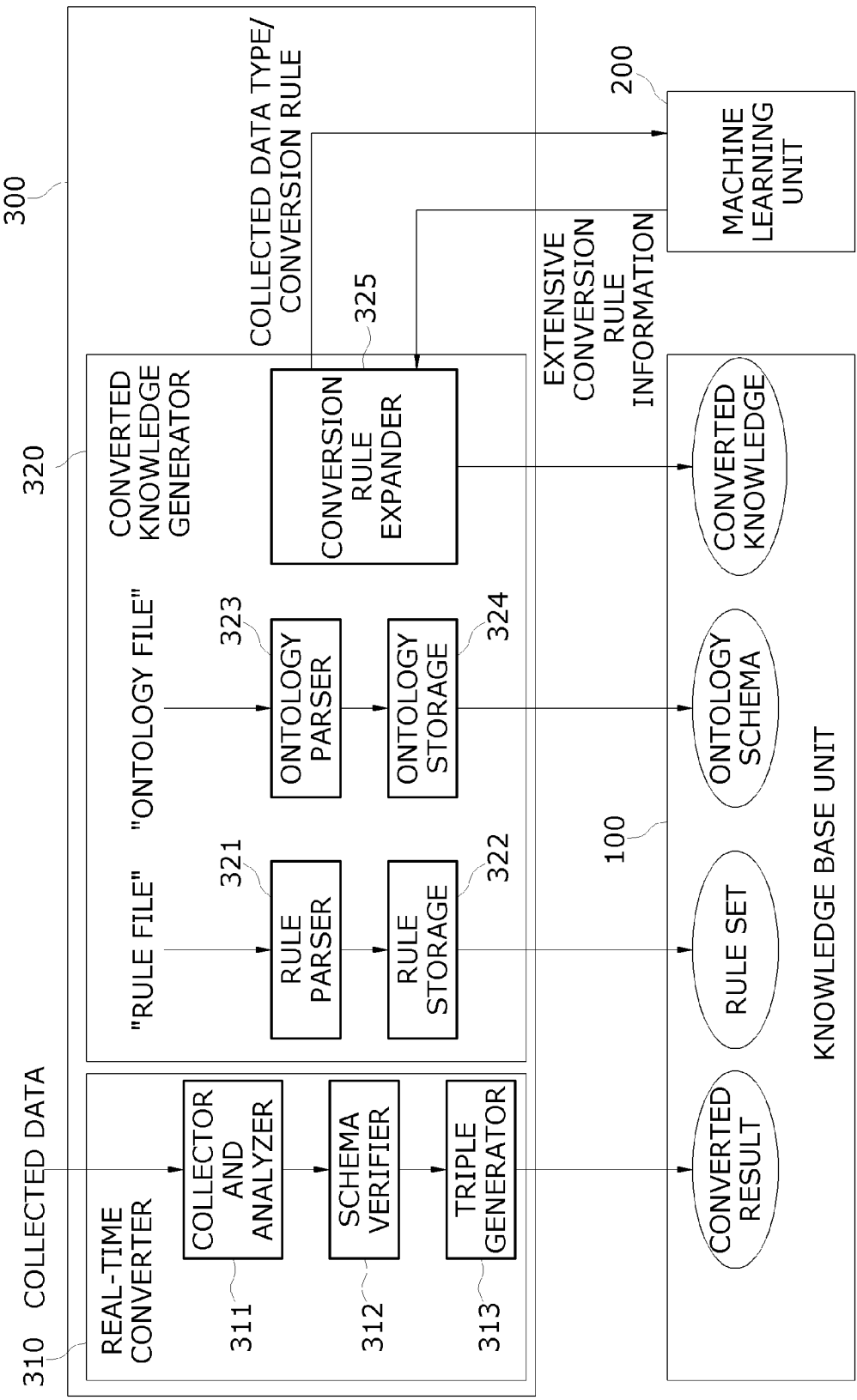
FIG. 2 is a block diagram showing a detailed configuration of a data conversion unit of the data processing apparatus according to the present invention.

FIG. 2 is a block diagram showing a detailed configuration of the data conversion unit 300 of the data processing apparatus according to the present invention.

Referring to FIG. 2, the data conversion unit 300 according to the present invention may include a real-time converter 310 and a converted knowledge generator 320.

The real-time converter 310 is configured to convert collected data generated by an application service system into a predetermined type of knowledge information (e.g., semantic data) by using a conversion rule prestored in the knowledge base unit 100 and may include a collector and analyzer 311, a schema verifier 312, and a triple generator 313.

The real-time converter 310 of the data conversion unit 300 collects data generated by the corresponding application service system through the collector and analyzer 311. The collected data is multimodal data including a sensor stream, structured data, non-structured data, or the like.

The schema verifier 312 derives ontology schema information to be mapped to the conversion of the collected data by using a conversion rule and ontology schema information that are preloaded from the knowledge base unit 100 and verifies the collected data by using the ontology schema information.

Also, the triple generator 313 generates final semantic data corresponding to the collected data by using information that has been verified and stores the final semantic data in the knowledge base unit 100.

Subsequently, the converted knowledge generator 320 is configured to perform knowledge conversion on and augment the conversion rule. In particular, the converted knowledge generator 320 may parse a predefined rule file and an ontology file, generate and store conversion knowledge for performing semantic conversion on the collected data, that is, a conversion rule and an ontology schema, derive extensive conversion rule information applicable to a new type of collected data through the machine learning unit 200, and generate a new conversion rule by applying the extensive conversion rule information.

To this end, the converted knowledge generator 320 may include a rule parser 321, a rule storage 322, an ontology parser 323, an ontology storage 324, and a conversion rule expander 325.

The converted knowledge generator 320 collects a conversion rule and an ontology that were previously made or used, parses the conversion rule and the ontology through the rule parser 321 and the ontology parser 323, and stores the parsed conversion rule and ontology in the knowledge base unit 100 through the rule storage 322 and the ontology storage 324 as converted knowledge information.

Furthermore, the conversion rule expander 325 delivers the type of collected data input to the real-time converter 310 and a pre-existing conversion rule stored in the knowledge base unit 100 to the machine learning unit 200 so that the type of collected data and the pre-existing conversion rule may be learned. Thus, the machine learning unit 200 returns extensive conversion rule information corresponding to the type of collected data to the conversion rule expander 325 through a machine learning analysis.

The conversion rule expander 325 stores a new conversion rule obtained by applying the extensive conversion rule information extracted through the machine learning in the knowledge base unit 100, and the stored new conversion rule may be loaded by the real-time converter 310 and applied to the data conversion.

Figure 3:
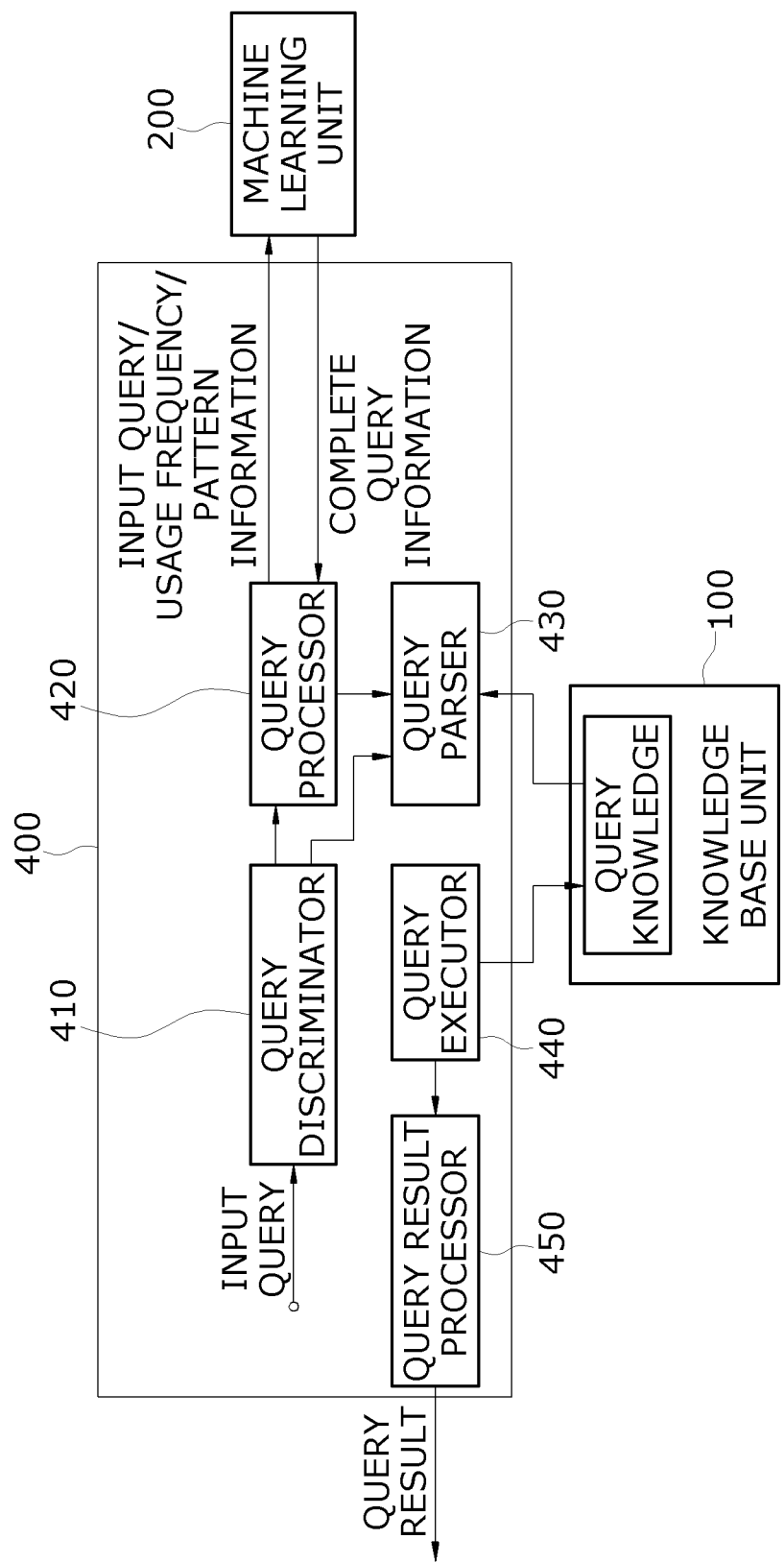
FIG. 3 is a block diagram showing a detailed configuration of a query unit of the data processing apparatus according to the present invention.

Subsequently, FIG. 3 is a block diagram showing a detailed configuration of the query unit 400 for processing a user query of the data processing apparatus according to the present invention.

Referring to FIG. 3, the query unit 400 may include a query discriminator 410, a query processor 420, a query parser 430, a query executor 440, and a query result processor 450.

The query unit 400 receives a user query for requesting a knowledge information search through an application service system or a separate user interface. In this case, the received user query may include both of a user query of a predefined structured format (e.g., a semantic query language such as SPARQL and a user query of a semi-structured format (e.g., Non-SPARQL) other than the structured format.

Thus, the query unit 400 determines whether the received user query has a structured format or a semi-structured format by means of the query discriminator 410.

The user query of the structured format is directly parsed by the query parser 430. At this point, the query parser 430 checks grammar of the user query, processes predefined information (i.e., Prefix) to generate a final join tree, stores the created join tree in an internal memory. Also, the query executor 440 processes the query on the basis of the join tree, extracts knowledge information corresponding to the user query, and delivers the extracted knowledge information to the query result processor 450. The query result processor 450 returns the extracted knowledge information to the application service system.

Conversely, when the received user query has an unstructured format, the received user query is delivered to the query processor 420.

The query processor 420 performs a pattern matching by comparing the received user query with a user query of a predetermined structured format, input the received user query, pattern matching information, and a usage frequency to the machine learning unit 200 to request the machine learning unit 200 to perform a machine learning analysis. Thus, the machine learning unit 200 analyzes the user query of the semi-structured format on the basis of the pattern matching information and the usage frequency and outputs complete query information for completing the user query of the semi-structured format to the structured format to the query processor 420. The query processor 420 combines pre-existing pattern matching information and the complete query information and converts the user query into the structured format. For example, when a semi-structured user query "A and B=?" is input and a user query of the structured format "A' and B=?" and "C and B=?" is converted into knowledge, the query processor 420 extracts pattern matching information regarding "A' and B=?" and "C and B=?" which are similar to the received user query through a pattern matching, extracts a usage frequency for each pattern, and input the extracted pattern matching information and usage frequency to the machine learning unit 200. Thus, the machine learning unit 200 may extract information regarding A for completing the semi-structured user query "A and B=?" as complete query information on the basis of the pattern matching information, and the query processor 420 may apply the complete query information, that is, the information regarding A to the pre-existing structured format "A' and B=?" to complete the user query of the structured format "A and B=?"

The complete user query is delivered to the query parser 430, and the query parser 430 checks grammar of the received user query, processes predefined information (i.e. Prefix) to generate a join tree for the received user query, and stores the generated join tree in an internal memory (a platform in memory). Subsequently, like the user query of the structured format, the query executor 440 processes the query on the basis of the join tree and outputs knowledge information found as a result of the processing to the corresponding application service system through the query result processor 450. In addition, the complete user query of the structured format may be stored in the knowledge base unit 100 as the knowledge information and may be used to process a subsequent user query.

By augmenting, through the query unit 400, the knowledge information regarding the user query in accordance with a dynamically changing application service environment, it is possible to effectively process various user queries generated in the application service environment.

Figure 4:
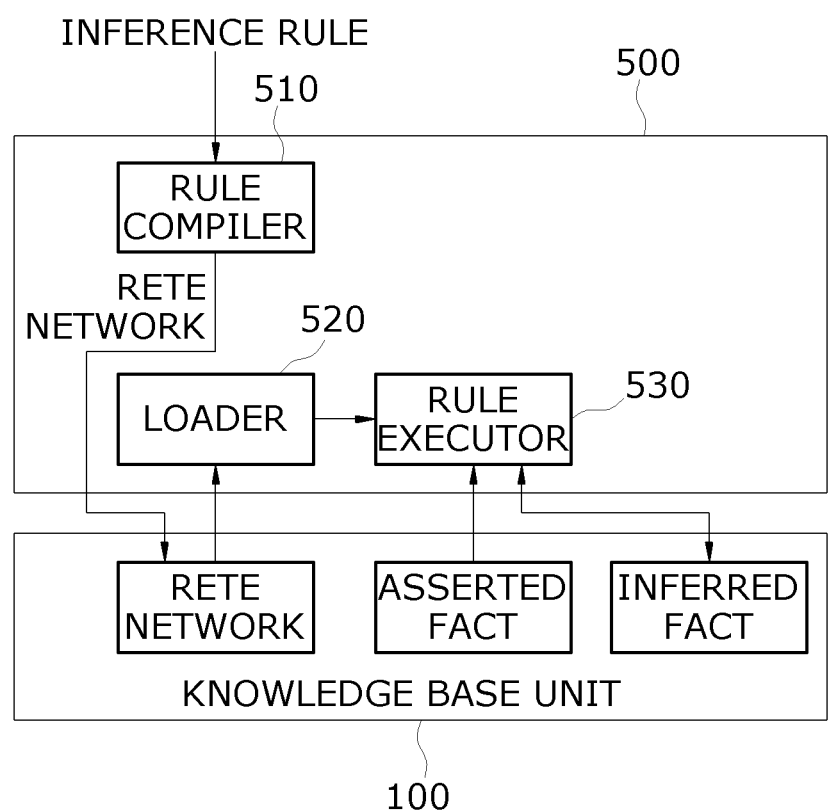
FIG. 4 is a block diagram showing a detailed configuration of an inference unit of the data processing apparatus according to the present invention.

Subsequently, FIG. 4 is a block diagram showing a detailed configuration of the inference unit 500 of the data processing apparatus according to the present invention.

The inference unit 500 receives a predetermined type of inference rule (e.g., a semantic compatible rule (an RDF rule, an OWL rule, etc.)) and an inference rule written in the form of a user defined rule, generates a Rete network for executing the inference rule, and derives a final inference rule when new information is input using the generated Rete network. As reference, the inference unit 500 has been described as performing an inference on the basis of a Rete algorithm. However, the present invention is not limited thereto, and various algorithms that are well known as an inference algorithm may be used.

Here, the inference rule input to the inference unit 500 includes a context awareness rule generated by the context awareness unit 600.

In order to perform such execution, the inference unit 500 according to the present invention may include a rule compiler 510, a loader 520, and a rule executor 530, as shown in FIG. 4.

When a new inference rule including the context awareness rule is input to the inference unit 500, the rule compiler 510 complies the input inference rule, generates a Rete network for performing a pattern matching according to the new inference rule, and stores the Rete network in the knowledge base unit 100.

The loader 520 loads the Rete network in an internal memory (a platform in memory) from the knowledge base unit 100 in order to perform the inference.

The rule executor 530 performs a matching work of individual patterns of the rule by using the Rete network loaded by the loader 520 and new input information (an asserted fact), performs a partial matching by using a result of the pattern matching, and extracts an inference result by combining results of the partial matching. The inference result may be stored in the knowledge base unit 100.

Figure 5:
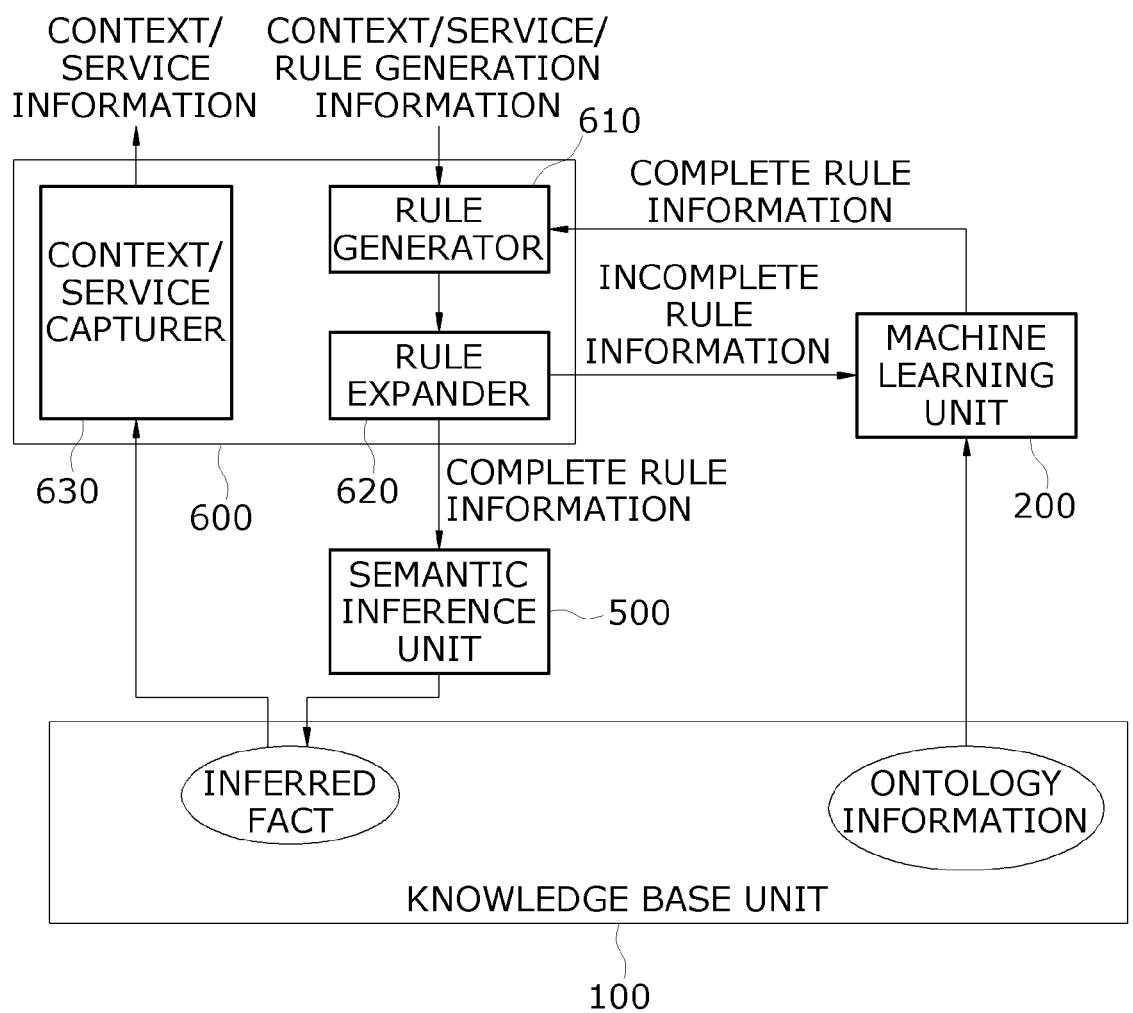
FIG. 5 is a block diagram showing a detailed configuration of a context awareness unit of the data processing apparatus according to the present invention.

Last, FIG. 5 is a block diagram showing a detailed configuration of the context awareness unit 600 of the data processing apparatus according to the present invention.

Referring to FIG. 5, the context awareness unit 600 may include a rule generator 610, a rule expander 620, and a context and service capturer 630.

The rule generator 610 receives context information, service information, and rule generation information from the application service system and generates a context awareness rule. In this case, the context awareness rule generated by the rule generator 610 may be classified into three types, i.e., a complete rule in which all information of the rule is complete, a partial rule in which complete rule information and incomplete rule information are mixedly present, and an incomplete rule in which all information is incomplete.

Here, the rule information being complete denotes that all information included in the rule is clearly defined, and the rule information being incomplete denotes that at least one piece of information included in the context awareness rule is unclear.

In this case, the complete rule may be delivered to the inference unit 500 and directly reflected in the inference rule, but the partial rule and the incomplete rule should be converted into a complete rule because the partial rule and the incomplete rule cannot be processed by the inference unit 500.

Accordingly, the rule expander 620 checks the type of the context awareness rule generated by the rule generator 610, delivers the context awareness rule to the inference unit 500 when the context awareness rule is a complete rule, and delivers the context awareness rule to the machine learning unit 200 when the context awareness rule is not a complete rule, that is, is a partial rule or an incomplete rule.

The machine learning unit 200 receives an ontology including domain-associated knowledge information stored in the knowledge base unit 100, performs machine learning on incomplete rule information regarding a partial rule and an incomplete rule input from the rule expander 620 to derive complete rule information, and delivers the complete rule information to the rule generator 610.

The rule generator 610 reflects the complete rule information delivered from the machine learning unit 200 in the partial rule and the incomplete rule to generate a complete rule.

The generated complete rule is delivered to the inference unit 500 through the rule expander 620.

As described above, the delivered context awareness rule of a complete rule type is generated by the inference unit 500 as a Rete network. The inference unit 500 infers new input information (an asserted fact) and stores inference information in the knowledge base unit 100.

The context and service capturer 630 derives context and service information from the inference information inferred by the inference unit 500 from the knowledge base unit 100 and delivers the context and service information to the application service system.

As described above, the present invention may generate and gradually expand a context awareness rule for inferring context and service information in accordance with an application service environment and may provide, to the application service system, an inference rule in which the augmented context awareness rule is reflected.

According to the above-described configuration, the present invention may change a knowledge information processing process in accordance with a dynamically changing application service environment, such as an Internet of Everything (IoE) environment, and thus process large-scale and real-time data generated in the application service environment to convert the data into knowledge by merging a pre-existing deterministic knowledge processing process and a non-deterministic knowledge processing process for deriving information for knowledge processing as knowledge information through data analysis based on machine learning.

In addition, the present invention may gradually augment knowledge information regarding user queries and process various user queries in a dynamically changing application service environment by converting even the user queries into knowledge, converting a user query of a semi-structured format into a user query of a structured format through machine learning based on pre-existing knowledge information regarding the user queries when the user query of the semi-structured format is input, and converting the converted user query into knowledge.

Also, the present invention may provide context awareness services of various IoE environments and dynamically augment a context awareness rule by converting the context awareness rule into knowledge in accordance with an application service environment and gradually augmenting the context awareness rule.

INDUSTRIAL APPLICABILITY

According to the above-described configuration, the present invention may change a knowledge information processing process in accordance with a dynamically changing application service environment, such as an Internet of Everything (IoE) environment, and thus process large-scale and real-time data generated in the application service environment to convert the data into knowledge by merging a pre-existing deterministic knowledge processing process and a non-deterministic knowledge processing process for deriving information for knowledge processing as knowledge information through data analysis based on machine learning.

In addition, the present invention may gradually augment knowledge information regarding user queries and process various user queries in a dynamically changing application service environment by converting even the user queries into knowledge, converting a user query of a semi-structured format into a user query of a structured format through machine learning based on pre-existing knowledge information regarding the user queries when the user query of the semi-structured format is input, and converting the converted user query to knowledge.

Also, the present invention may provide context awareness services of various IoE environments and dynamically augment a context awareness rule by converting the context awareness rule into knowledge in accordance with an application service environment and gradually augmenting the context awareness rule.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A data processing apparatus for merging and processing deterministic and non-deterministic knowledge, the data processing apparatus interoperating with a specific application service system to process knowledge information of a corresponding application service environment, the data processing apparatus comprising:
   a knowledge base unit configured to store the knowledge information, the knowledge information including a conversion rule for converting collected data generated by the application service system into a predetermined type of knowledge;
   a machine learning unit configured to perform machine learning on the converted knowledge stored in the knowledge base unit on a data type basis and extract extensive conversion rule information according to the type of collected data;
   a data conversion unit configured to input data type information regarding collected data generated in the specific application service environment and the conversion rule of the knowledge base unit to the machine learning unit, augment the conversion rule of the knowledge base unit by reflecting the extensive conversion rule information extracted by the machine learning unit, and convert the collected data generated in the specific application service environment into knowledge information on the basis of the conversion rule of the knowledge base unit; and
   a context awareness unit configured to receive context information, service information, and rule generation information from the application service system, generate context awareness rules for context awareness, extract complete rule information for an incomplete rule among generated context awareness through the machine learning unit, generate a complete context awareness by reflecting the extracted complete rule information, and provide context information or service information derived by applying the context awareness rule to the application service system.

2. The data processing apparatus of claim 1, wherein the data conversion unit converts the collected data into semantic data.

3. The data processing apparatus of claim 1, further comprising a query unit configured to search the knowledge base unit according to a user query delivered from the application service system, determine whether the user query has a predetermined structured format, and convert the user query into the structured format through the machine learning unit when the user query does not have the structured format, wherein:
   the knowledge base unit further stores knowledge information regarding the user query;
   the machine learning unit performs learning on the basis of the knowledge information regarding the user query stored in the knowledge base unit to extract complete query information for converting the user query into the structured format; and
   the query unit converts the user query into the structured format on the basis of the complete query information.

4. The data processing apparatus of claim 1,
   wherein the knowledge base unit further includes knowledge information regarding the context awareness rule; and
   the machine learning unit performs machine learning on the knowledge information regarding the context awareness rule to extract the complete rule information.

5. The data processing apparatus of claim 4, further comprising an inference unit configured to infer the context information or service information from the collected data on the basis of an inference rule including the context awareness rule.

6. A data processing method for merging and processing deterministic knowledge and non-deterministic knowledge, the data processing method for interoperating with a specific application service system to process knowledge information of a corresponding application service environment, the data processing method comprising:
   storing knowledge information regarding a conversion rule for converting data generated by the application service system into a predetermined type of knowledge; and
   converting collected data generated in the application service environment into the predetermined type of data on the basis of the conversion rule of the knowledge information, wherein the converting comprises:
   performing machine learning on the conversion rule on the basis of data types of the collected data generated in the application service system to extract extensive conversion rule information according to the type of collected data; and
   augmenting the knowledge information regarding the conversion rule by reflecting the extensive conversion rule information corresponding to the type of collected data to a conversion rule expander through the performed machine learning.

* * * * *